United States Patent [19]

Tomizawa

[11] Patent Number: 5,126,782
[45] Date of Patent: Jun. 30, 1992

[54] IMAGE RECORDING APPARATUS WITH A DETECTING DEVICE FOR DETECTING A REMAINING AMOUNT OF A PHOTO-SENSITIVE RECORDING MEDIUM

[75] Inventor: Takashi Tomizawa, Aichi, Japan

[73] Assignee: Brother Kogyo Kabushiki Kaisha, Nagoya, Japan

[21] Appl. No.: 542,930

[22] Filed: Jun. 25, 1990

[30] Foreign Application Priority Data

Jul. 19, 1989 [JP] Japan .................................. 1-188053

[51] Int. Cl.⁵ .............................................. G03B 27/52
[52] U.S. Cl. .................................................. 355/27
[58] Field of Search .................... 355/27, 100, 106, 72, 355/50

[56] References Cited

U.S. PATENT DOCUMENTS

| | | | |
|---|---|---|---|
| 4,351,609 | 9/1982 | Inoue et al. | 355/50 |
| 4,947,472 | 8/1990 | Maeda | 355/72 |
| 4,994,851 | 2/1991 | Iwai | 355/72 X |
| 5,028,953 | 7/1991 | Katoh et al. | 355/27 |
| 5,049,921 | 9/1991 | Sonobe et al. | 355/27 |

Primary Examiner—L. T. Hix
Assistant Examiner—D. Rutledge
Attorney, Agent, or Firm—Oliff & Berridge

[57] ABSTRACT

An image recording apparatus forms the image by using a photo-sensitive sheet accommodated in a cartridge, one side of which has a bar code attached. In this recording apparatus, a remaining amount of the sheet in the cartridge at a given time is calculated by substracting a used amount of the sheet detected by a rotary encoder installed on a motor shaft of a sheet feeding device from a total amount of the sheet detected by reading the bar code through a bar code reading device, and is displayed on a display. And, this recording apparatus corrects the remaining amount of the sheet in the cartridge based on a rewound amount of the sheet detected by the rotary encoder when a single copy mode is selected. Further, the apparatus displays copyable numbers according to the remaining amount of the sheet based on a copy size set. Therefore, it is possible by the recording apparatus to precisely recognize the remaining amount of the sheet in the cartridge at an arbitrary time and a timing for exchanging the old cartridge for a new cartridge.

14 Claims, 6 Drawing Sheets

IMAGE RECORDING APPARATUS WITH A DETECTING DEVICE FOR DETECTING A REMAINING AMOUNT OF A PHOTO-SENSITIVE RECORDING MEDIUM

BACKGROUND OF THE INVENTION

1. Field of the Invention

This invention relates to an image recording apparatus, and more particularly to an image recording apparatus having a function of detecting a remaining amount of a photo-sensitive and pressure-sensitive sheet in the form of a roll.

2. Description of Related Art

Conventionally, in an image recording apparatus which uses a photo-sensitive and pressure-sensitive sheet in the form of a roll inserted in a cartridge for the exclusive use, a remaining amount of the sheet cannot be recognized from an external appearance. Thus, it has been a common practice that a last end of the sheet is detected by means of a contact type sensor or the like to indicate that the cartridge for the sheet has been empty. From such indication, a user perceives a timing at which the cartridge should be replaced by another new cartridge.

However, with such an image recording apparatus as described above, a user does not perceive the necessity of replacement of a cartridge until after the cartridge has been emptied. Therefore, an extra cartridge or the like must always be ready, which is inconvenient for a user.

Meanwhile, as a method of perceiving a remaining amount of the photo-sensitive and pressure-sensitive sheet in the form of a roll, a value of a number of images already produced subtracted from a producible number of images of the sheet in the form of a roll accommodated in a cartridge can be obtained readily.

However, the photo-sensitive and pressure-sensitive sheet in the form of a roll may not only advance but also retreat in an image forming cycle, and output images may have a plurality of sizes. In such a case, it is difficult to accurately indicate a remaining amount by counting a number of images produced.

SUMMARY OF THE INVENTION

The present invention has been made to solve such a problem as described above and contemplates improvement in convenience in use and in efficiency in replacement of the photo-sensitive and pressure-sensitive sheet by enabling a user to recognize a remaining amount of the sheet in a cartridge accurately and readily and to perceive consumption of the sheet before such consumption takes place without requiring a considerable increase in cost compared with a conventional apparatus.

In order to achieve the object described above, an image recording apparatus which uses a photo-sensitive and pressure-sensitive sheet accommodated in a disposable cartridge comprises a transport amount detecting means provided in a transport system of the sheet for detecting a transport amount of the sheet, and a calculating means for calculating a remaining amount of the sheet in the cartridge in accordance with a transport amount detected by the transport amount detecting means.

Further, the remaining amount calculating means has a calculating function of calculating a remaining amount of the photo-sensitive and pressure-sensitive sheet as a remaining number of producible images. Meanwhile, the transport amount detecting means has a function of correcting a transport amount when the sheet is fed backwardly.

Further, a bar code indicative of an overall amount of the photo-sensitive and pressure-sensitive sheet accommodated in the cartridge may be provided on the disposable cartridge while a reading means for the bar code is provided in a body of the apparatus and the calculating means has a calculating function of calculating a remaining amount of the sheet in the cartridge from an overall amount of the sheet read by the reading means and a transport amount detected by the transport amount detecting means.

According to the present invention having, in one aspect, such a construction as described above, a length of the photosensitive and pressure-sensitive sheet which has been used at an arbitrary point of time can be recognized. Since the apparatus has a function for subtracting a rewound amount of the sheet from the used length of the sheet when the sheet is rewound, a distance used in fact is stored accurately. In particular, while feeding back of the sheet is performed by reversely rotating the same motor as is used for the feeding, the fed back amount then is measured by means of an encoder similarly to in feeding. Then, an output of the encoder is transmitted to the calculating device in which a fed back amount is subtracted from an entire amount of a fed amount.

The above and further objects and novel features of the invention will more fully appear from the following detailed description when the same is read in connection with the accompanying drawings. It is to be understood, however, that the drawings are for purpose of illustration only and are not intended as a definition of the limits of the invention.

DETAILED DESCRIPTION OF THE PREFERRED EMBODIMENTS

In the following, preferred embodiments of the present invention will be described with reference to the drawings.

Figure 1:
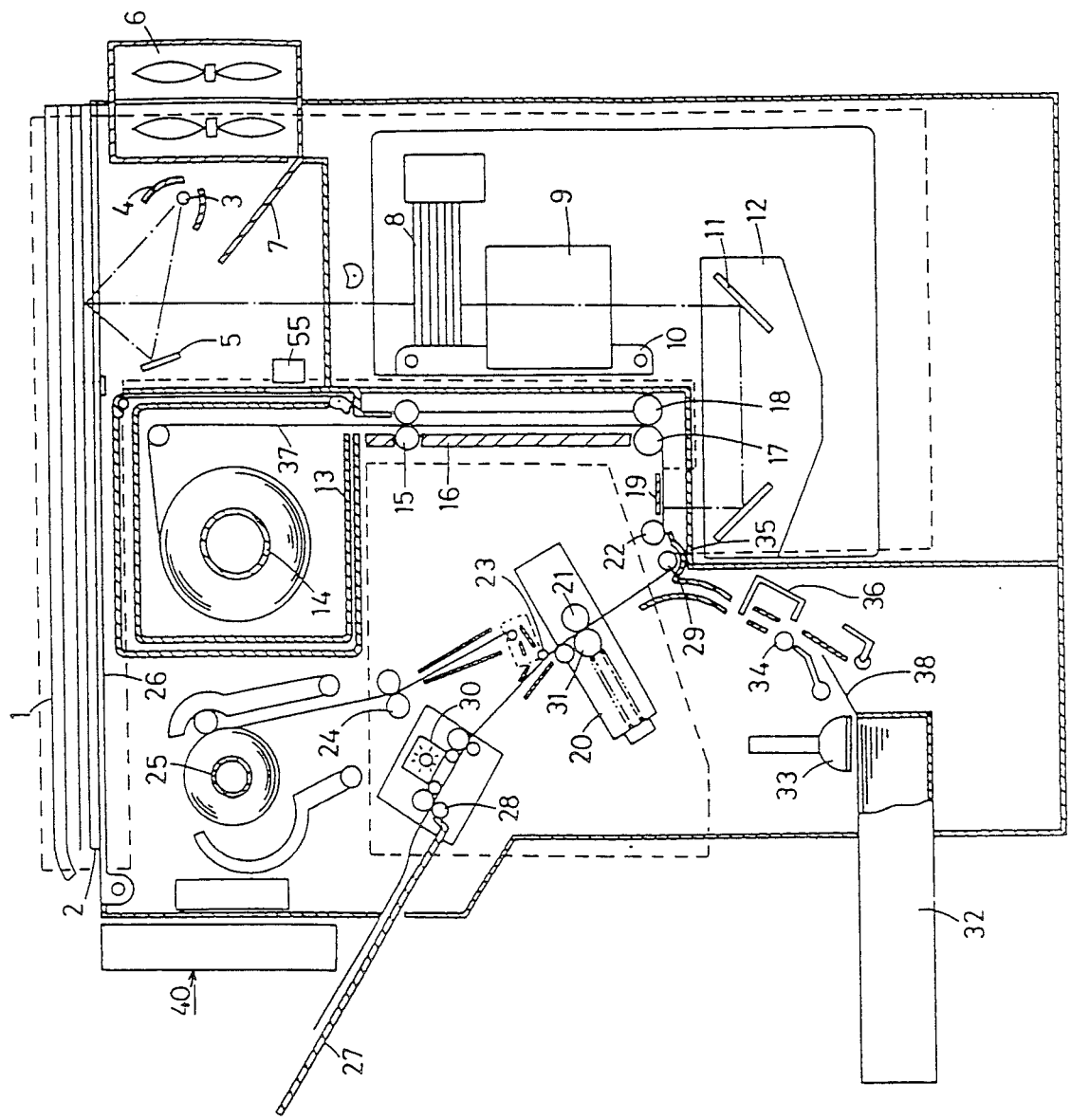
FIG. 1 is a front elevational sectional view of an image recording apparatus according to an embodiment of the present invention.

An embodiment of the present invention is shown in FIG. 1. The color image recording apparatus shown in FIG. 1 is of the type using a transfer type microcapsule sheet made up of a microcapsule sheet and a developer sheet.

Recording apparatus of the type mentioned are disclosed, e.g., in U.S. patent applications Ser. Nos. 07/156,744, 07/281,327, 07/283,845, 07/281,215, 07/300,841 and 07/351,665 all assigned to the present assignee.

That is, in the top portion of a recording apparatus 40, an original-mount carriage 2 on an upper plate 26 and a cover member 1 are provided so as to be movable in rightward and leftward directions. On the carriage 2, an original document is placed. In the right upper portion of the recording apparatus 40, a halogen lamp 3 and a semicylindrical shape reflection mirror 4 surrounding the halogen lamp 3 are provided and light is irradiated onto the carriage 2. Accordingly, the light radiated from the halogen lamp 3 is irradiated onto the entire image-carrying surface of the original through the original-mount carriage 2 from the left side to the right side portion in accordance with the movement of the carriage 2. The light radiated from the halogen lamp 3 is reflected on the original. The cover member 1 serves to shield the light so as not to escape. In the left portion of the halogen lamp 3, a reflector 5 is provided for directing the light radiated from the halogen lamp 3 onto the original. In the right portion of the halogen lamp 3, a fan 6 and a lamp house 7 are provided to introduce air into the interior of the recording apparatus.

The light reflected on the original enters into a lens 9 through a filter 8. The light transmission characteristic of the filter 8 is changed in accordance with a sensitivity characteristic of a microcapsule sheet 7 to adjust the tone of a reproduced picture image. The lens 9 is attached to a lens attachment plate 10 so that the alignment of the lens 9 with respect to an optical path may be finely adjusted. The light focused by the lens 9 is directed upwardly by a pair of reflection mirrors 11, and a a latent image is formed on the microcapsule sheet 37 which is held on the lower surface of an exposure stand 19. The pair of the reflection mirrors 11 are fixedly secured to a mirror attachment plate 12, and the optical path length and the focusing are adjusted by finely adjusting the attachment position of the reflection mirrors 11.

The microcapsule sheet 37 is in an elongated, weblike continuous form and is wound around a supply shaft 14. The microcapsule sheet 37 being wound there around is accommodated in a supply cartridge 13 which is detachably mounted below the carriage 2 and may be disposable. One end of the microcapsule sheet 37 extends to a take-up shaft 25 passing through a pressure-developing unit 20. Specifically, the microcapsule sheet 37 coming through the lower portion of the cartridge 13 passes through the lower surface of the exposure stand 19 while being guided by a pair of feeding rollers 15, a barrel-shaped roller 17, a feeding roller 18, a drive roller 22, a nip roller 35 and a dancer roller 29, and then is supplied to the pressure-developing unit 20. The microcapsule sheet 37 which has passed through the pressure-developing unit 20 is guided by a peeling roller 23 and a meander adjusting roller 24, and is wound around the take-up shaft 25. The microcapsule sheet 37 coming through the cartridge 13 remains unexposed by means of a light shielding member 16.

The running speed of the microcapsule sheet 37 is controlled to be constant by the pair of feed rollers 15 and the nip roller 35 and is made to be equal to the moving speed of the carriage 2. Accordingly, a latent image corresponding to the original is formed on the microcapsule sheet 37 on line basis when the microcapsule sheet 37 passes through the exposure stand 19.

In the lower portion of the pressure-developing unit 20, a sheet cassette 32 is provided in which cut developer sheets 38 are stacked. The uppermost developer sheet 38 is fed out by the actuation of a sucker 33 and the top end portion of the developer sheet 38 is aligned by a feeding roller 34 and a registration gate 36. The microcapsule sheet 37 is then merged with the developer sheet 38, and both are introduced into the pressure-developing unit 20. The pressure-developing unit 20 is comprised of a roller 21 and a backup roller 31, in which the microcapsule sheet 37 and the developer sheet 38 are subjected to pressure development. When the pressure development is carried out, the surface of the microcapsule sheet 37 on which the latent image is formed and the surface of the developer sheet 38 on which the developer material is coated are confronted. The microcapsule sheet 37 and the developer sheet 38 which are held in intimate contact with each other are subjected to the pressure development by passing through a nip between the rollers 21 and 31, whereupon the unexposed microcapsules are ruptured and a visible image is formed on the developer sheet 38.

The microcapsule sheet 37 and the developer sheet 38 which have passed through the pressure-developing unit 20 are conveyed forwardly and are separated by the peeling roller 23. The microcapsule sheet 37 is moved in the upward direction and the developer sheet 38, i.e., copy sheet, is conveyed to the direction substantially orthogonal to the moving direction of the microcapsule sheet 37. The copy sheet 38 passes through a heat fixing unit where the formation of the image is promoted, and is discharged onto a tray 27 with the image side face-up. The heat fixing unit is comprised of a dryer 30 provided with a heater in its inside and a copy sheet feeding roller 38.

The microcapsule sheet 37 passes through the meander adjusting roller 24 and is wound around the take-up shaft 25.

Figure 2:
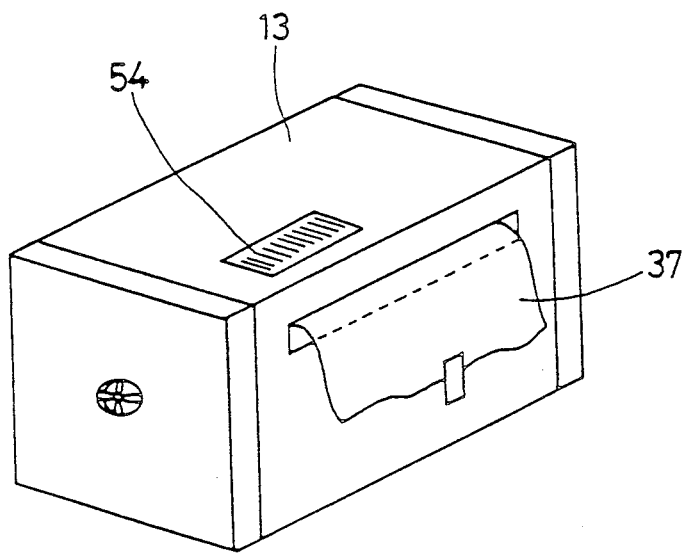
FIG. 2 is a perspective view of a cartridge for accommodating a photo-sensitive and pressure-sensitive sheet therein.

FIG. 2 shows a perspective view of the cartridge 13 for accommodating a microcapsule sheet therein, and the cartridge 13 is accommodated in a condition wherein the microcapsule sheet 37 is wound in the form of a roll around the supply shaft 14 and has a bar code 54 applied to a side face thereof. Such bar code 54 indicates information of a wound length of the microcapsule sheet 37 (a length which can be used to copy), and the information is read by a bar code reading device 55 shown in FIG. 1. The cartridge may be of a type which is thrown away after all of the sheet is used.

Figure 3:
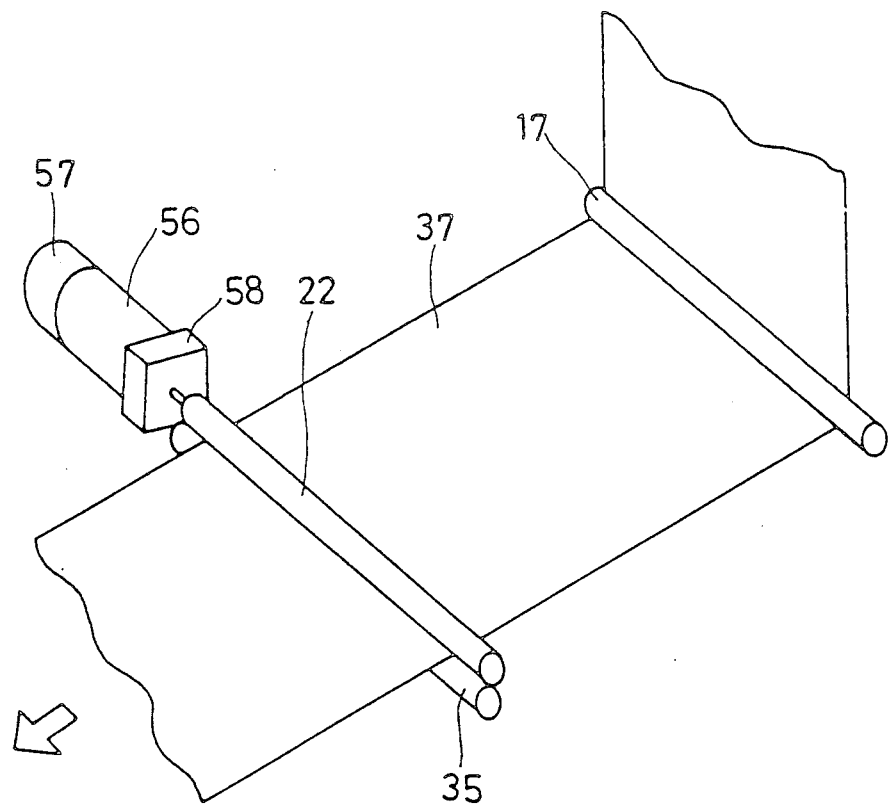
FIG. 3 is a perspective view of a transport device for the photo-sensitive and pressure-sensitive sheet in the image recording apparatus.

Meanwhile, FIG. 3 shows a feeding mechanism for a microcapsule sheet in the form of a web in the image recording apparatus. The microcapsule sheet 37 is held between the drive roller 22 and the nip roller 35, and the nip roller 35 is urged to press against the drive roller 22 by a tension spring (not shown). The drive motor 56 is mounted on the drive roller 22 by way of a gear head 58. A rotary encoder 57 is mounted on a shaft of the drive motor 56.

Such rotary encoder 57 can be used to accurately count an amount of the microcapsule sheet 37 used in response to normal or reverse rotation of the motor 56. An appropriate encoder is a two track encoder which is known per se. The first track developer pulse signals at small increments of rotation for counting by a controller. The second track enables a discrimination of the rotation direction due to a phase difference with respect to the first track.

Subsequently, operation of the present embodiment will be described.

First, the upper plate 26 is opened, and the supply cartridge 13 is disposed into the recording apparatus 40. After the supply cartridge 13 is disposed in a specific position, automatic loading of the microcapsule sheet 37 is performed. Such automatic loading of the microcapsule sheet 37 will be described with reference to FIGS. 4 and 5.

Figure 4:
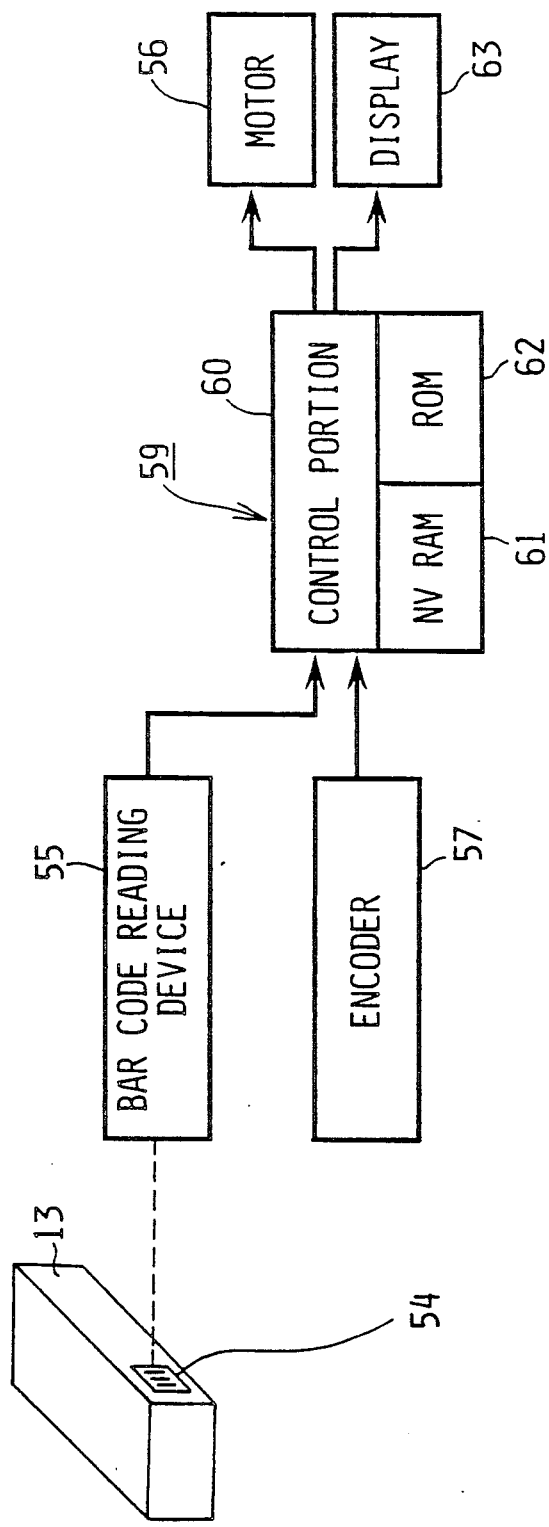
FIG. 4 is a block diagram of a controlling device which executes automatic loading and detection of a remaining amount of the photo-sensitive and pressure-sensitive sheet.

FIG. 4 shows a block diagram of a controlling device for controlling automatic loading and detection of a remaining amount of the microcapsule sheet 37. Referring to FIG. 4, a CPU (Central Processing Unit) 59 includes a control portion 60, an NV RAM (Non-Vaporizable Random Access Memory) 61 and a ROM (Read Only Memory) 62. The bar code reading device 55 and the encoder 57 are connected to the control portion 60, and the control portion 60 thus receives information from the bar code reading device 55 and the encoder 47 and controls the motor 56 and a display 63.

Figure 5:
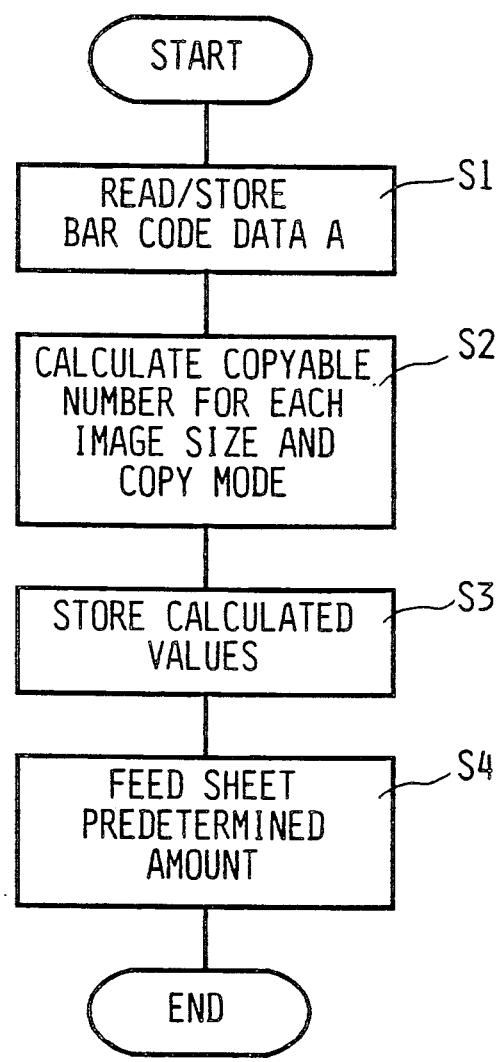
FIG. 5 is a flowchart illustrating an executing procedure in an automatic loading mode of the photo-sensitive and pressure-sensitive sheet cartridge.

Referring to FIG. 5 which illustrates an executing procedure of automatic loading of the microcapsule sheet 37, upon disposition of the supply cartridge 13, the bar code 54 on the cartridge 13 is read by the bar code reading device 55 and the data stored at step 1 (S1, abbreviated similarly in the following). The bar code 54 has data A of a copyable length of the microcapsule sheet 37. At S2, the control portion 60 calculates a copyable number for each available image size and each copy mode (i.e., single copy or successive coy as will be described) in accordance with such data from a reference value of a size of a copy image (for example, the A4 size or the A3 size, both sizes represent standards relating to a paper size in accordance with the Japanese Industrial Standard (JIS)). More specifically, by dividing the length data read from the bar code by the length used in making an A4 copy, a number of further A4 copies can be estimated. Since the length used per image differs depending upon the chosen copy mode, different data is used for the calculation depending on the copy mode. The calculated values are stored into the NV RAM 61 at S3, and then at S4, the feeding rollers 15, the drive roller 22 and so forth are driven to rotate by a predetermined amount to feed the microcapsule sheet 37 enough to be wound around the take-up shaft 25. Consequently, the image recording apparatus enters an initial state in which it can copy.

Figure 7:
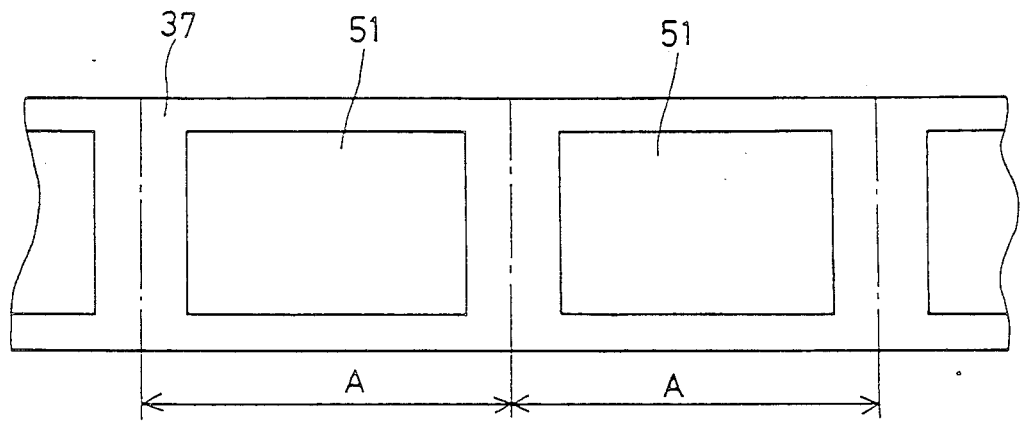
FIG. 7 is a concept view illustrating a condition wherein an image is formed on the photo-sensitive and pressure-sensitive sheet of the A4 size.

Subsequently, a copy mode of the image recording apparatus according to the present embodiment will be described. An original placed on the original-mount carriage 2 is irradiated by light from the halogen lamp 3, and an image of the original is formed in the form of a slit on the microcapsule sheet 37 by way of the filter 8, the lens 9 and the reflection mirrors 11. The microcapsule sheet 37 and the original-mount carriage 2 are moved in a synchronized relationship so that the entire face of the original is scanned. The microcapsule sheet 37 on which a latent image is formed is integrated with the developer sheet 38 and pressurized by the pressure-developing unit 20 so that the image is changed into a visible image on the developer sheet 38. The developer sheet 38 passes the dryer 30 and is discharged outside the apparatus. Meanwhile, the microcapsule sheet 37 passes the meander adjusting roller 24 and is wound around the take-up shaft 25. Here, in the case of a single copy mode wherein copying is performed one by one, it is rewound by a predetermined amount after separation thereof from the developer sheet in order to reduce an unused portion thereof between image portions 51 and 51 shown in FIG. 7 as far as possible to minimize a loss of the microcapsule sheet. However, upon successive copying, since exposure for the following copying is performed at the same time as the preceding copy cycle in order to save time, in the case of successive copying, rewinding is not performed.

Subsequently, a copy mode of the image recording apparatus will be described in detail with reference to a flow chart shown in FIG. 6. Here, the image recording apparatus can select not only an A4 size mode and an A3 size mode but also a single copy mode and a successive copy mode.

Figure 6:
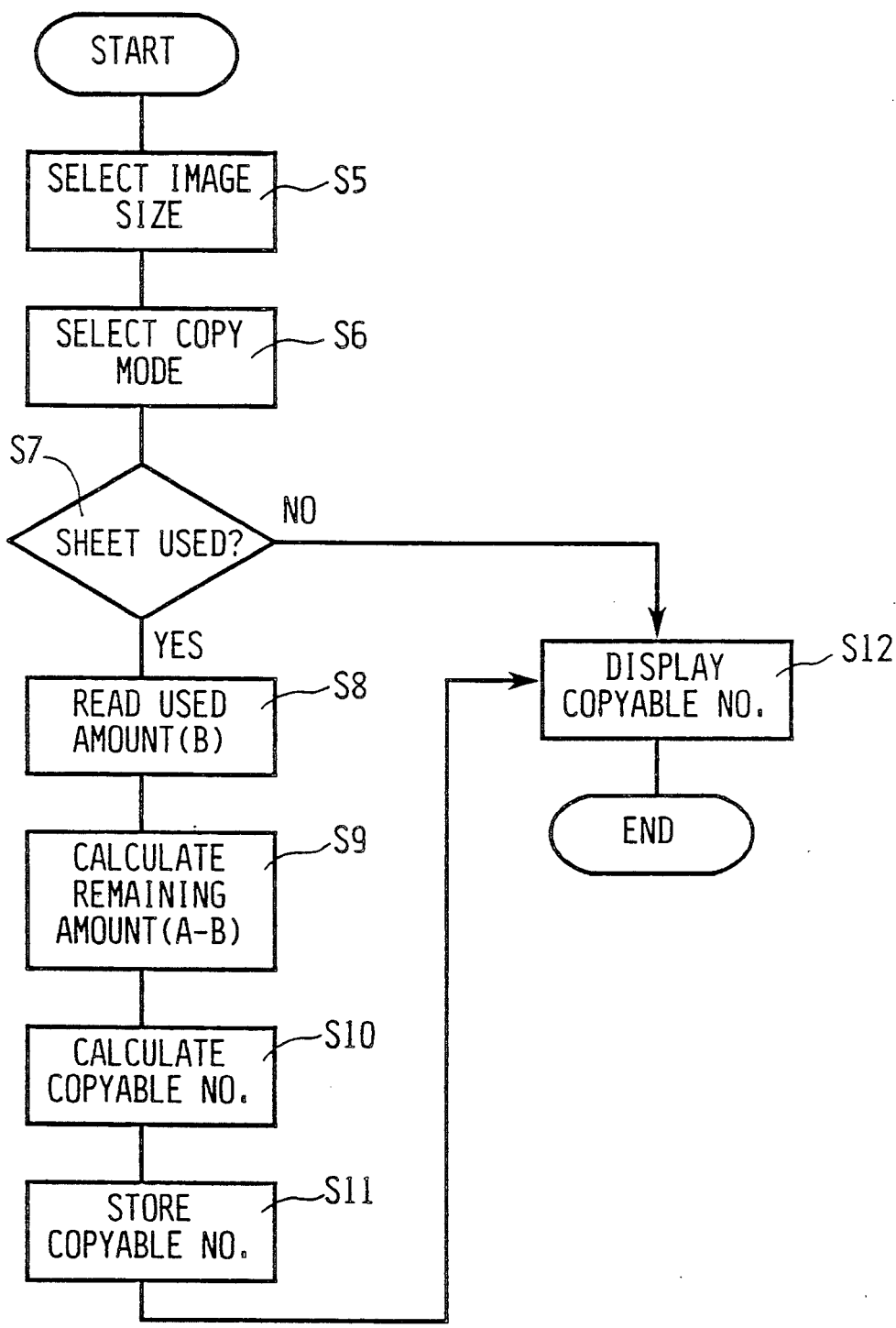
FIG. 6 is a flow chart illustrating an executing procedure of detecting a remaining amount of the photo-sensitive and pressure-sensitive sheet in a copy mode.

Referring to FIG. 6, selection of an image size is executed at S5 and this value is stored. Subsequently at S6, the copy mode (i.e., successive or single) is selected and data representative of the selected mode is stored. In step S7, it is judged whether or not the microcapsule sheet has been used. If the microcapsule sheet has been used for copying already, a used amount (B) is read at S8 from the NV RAM. The use amount is initially zero. Each time a copying operation is executed, the control portion updates the used amount data from the encoder data (pulse number and direction) and the diameter of the drive roller 22. The control portion and NV RAM thus operate as an up-down counter which continually monitors the use amount of the cartridge, taking account of both forward feeding and rewinding, via data from the encoder 57.

At S9, a remaining amount of sheet (A-B) is calculated and therefrom, a copyable number is calculated at S10 according to the selected image size and copy mode.

Copyable numbers for the individual image sizes are calculated from reference used amount data for copying of A4 images or reference used amount data for copying of A3 images in each copy mode, and then at S11, the calculated data are stored into the NV RAM 61.

After then, at S12, the stored copyable number is displayed on the display 63.

It is to be noted that, in case it is judged at S7 that the microcapsule sheet has not been used, the copyable number stored at S3 of the FIG. 5 routine corresponding to the chosen image size and copy mode is immediately displayed on the display 63 (S12).

In the present embodiment, feeding of the microcapsule sheet 37 is carried out by the feeding driving roller 22, and the feeding amount of the microcapsule sheet 37 is measured with a high degree of accuracy including a rewinding amount in accordance with an output of the rotary encoder 57. When an image of the A4 size is to be outputted, the microcapsule sheet 37 is used, in the case of the single copy mode, only by a length indicated by A in FIG. 7. Here, while only an image portion 51 is used directly for the formation of an image, the length A is required for the exposure of leading and trailing end portions and so forth by slit exposure. In the case of the single copy mode, since rewinding is involved, only the length A is required. Meanwhile, since no rewinding is performed in the case of the successive copy mode, the required microcapsule sheet 37 length is a 20 to 30% greater amount than the length A. While the lengths of the microcapsule sheet 37 used in individual copy cycles are different in this manner, according to the present embodiment, since the used length of the microcapsule sheet 37 is measured by means of the encoder 57, the used length of the microcapsule sheet 37 is inputted with a high degree of accuracy to the controlling device. Meanwhile, by reading the bar code applied to the cartridge or the like, also the length of the microcapsule sheet accommodated in the cartridge can be recognized. Accordingly, by subtracting the used length from the entire amount, the length at that time of the microcapsule sheet which is accommodated in the cartridge can be recognized, and by converting it into the number of reference output image sheets and displaying the number, a user can recognize what number of image outputs can be further obtained from the cartridge being used at present. Consequently, the user can forecast a timing at which the cartridge should be replaced and prepare spare cartridges or the like.

Figure 8:
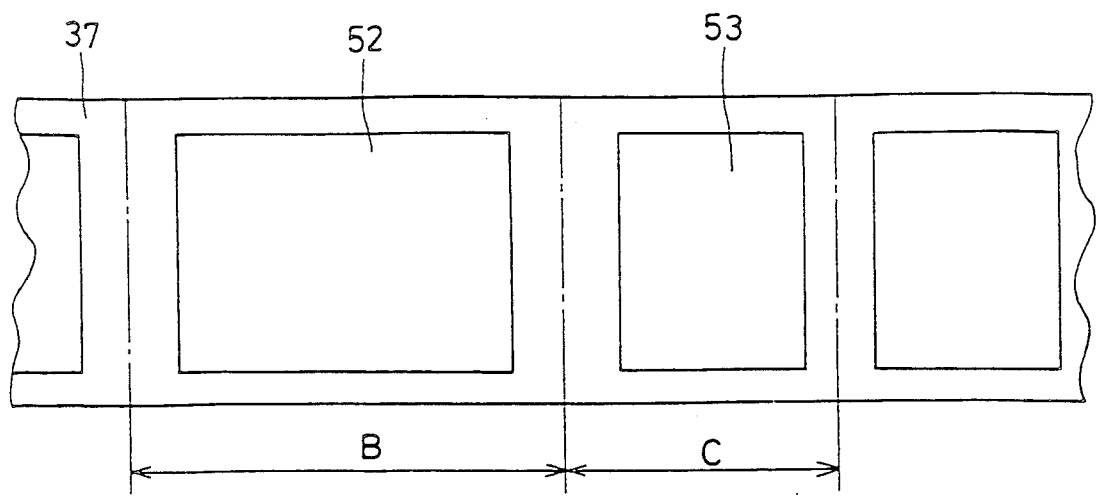
FIG. 8 is a concept view illustrating a condition wherein an image is formed on the photo-sensitive and pressure-sensitive sheets of the A4 and A3 sizes.

In a copying machine capable of selectively providing image outputs of both the A4 and A3 types, in the case of the A3 size, an image is formed on the microcapsule sheet 37 as shown by an A3 image portion 52 shown in FIG. 8, but in the case of the A4 size, an image is formed as shown by an A4 image portion 53, and the microcapsule sheets of lengths B and C are used, respectively. Also in this instance, a feeding amount and a rewinding amount are individually measured by means of the encoder 57. Such feeding amount is added by a calculating device, while such returning amount is subtracted by the calculating device.

Meanwhile, a length or a copyable number converted with the A4 size of the microcapsule sheet accommodated in the disposable cartridge is recorded in the bar code 54 attached sidewardly to the cartridge 13, and data of the length and so forth of the microcapsule sheet are inputted by means of the bar code reading device 55 fixed in a copying machine body. The controlling device has a calculating function, and the remaining amount of the microcapsule sheet which remains in the cartridge can be recognized and displayed at an arbitrary point of time.

Alternatively, the used amount of the microcapsule sheet may be displayed without displaying the remaining amount. Additionally, an accommodated amount of the microcapsule sheet in the cartridge may be read from the outer face of the cartridge and inputted manually by a user.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An image recording apparatus using a photosensitive recording medium on which an image is formed, comprising:
feed means for feeding the recording medium;
detecting means for detecting an amount of the recording medium fed by the feed means;
first calculating means for calculating a remaining amount of the recording medium based on an initial amount and a total fed amount of the recording medium detected by the detecting means
a supply cartridge detachably mounted in the apparatus, wherein the recording medium is accommodated in the cartridge;
data representing means for representing data of the initial amount of the recording medium in the supply cartridge; and
data reading means for reading the data represented by the representing means, the data reading means arranged in opposition to the data representing means.

2. An image recording apparatus according to claim 1, wherein the data representing means is a bar code and the data reading means is a bar code reading device.

3. An image recording apparatus according to claim 2, wherein the feed means includes a drive motor.

4. An image recording apparatus according to claim 3, wherein the detecting means is a rotary encoder mounted on a shaft of the drive motor.

5. An image recording apparatus according to claim 1, wherein the first calculating means calculates the remaining amount of the recording medium by subtracting the amount of the recording medium detected by the detecting means from the amount of the recording medium read from the data representing means by the data reading means.

6. An image recording apparatus according to claim 4, wherein the first calculating means comprises a control means to which the bar code reading device and the rotary encoder are connected and the control means calculates the remaining amount of the recording medium based on a result of comparing data read by the bar code reading device with data detected by the rotary encoder.

7. An image recording apparatus according to claim 1, further comprising:
a first setting means for setting one of a plurality of copy sizes;
a second calculating means for calculating a copyable number of images with the copy size set by the first setting means based on the remaining amount of the recording medium calculated by the first calculating means taking a standard amount according to the copy size into consideration; and
a display means for displaying the copyable number calculated by the second calculating means.

8. An image recording apparatus according to claim 7, further comprising a second setting means for setting one of a single copy mode where one by one copying is performed and a successive copy mode where successive copying is performed, said second calculating means taking account of the chosen copy mode in calculating the copyable number of images.

9. An image recording apparatus according to claim 8, further comprising: a rewinding means for rewinding the recording medium after every copying operation when the single copy mode is set by the second setting means.

10. An image recording apparatus which uses a photo-sensitive and pressure sensitive sheet accommodated in a disposable cartridge, comprising:
transport amount detecting means provided in a transport system of the sheet for detecting a transport amount of the sheet;

calculating means for calculating a remaining amount of the sheet in the cartridge based on an initial amount of the sheet and a transport amount detected by the transport amount detecting means; and reading means for reading data of an amount of the recording medium in the disposable cartridge represented on said disposable cartridge.

11. An image recording apparatus according to claim 10, wherein said reading means is a bar code reader.

12. A photo-sensitive sheet cartridge for use in an image recording apparatus, comprising:

a cartridge body;

a photo-sensitive sheet rotatably accommodated in said cartridge to be fed out of the cartridge; and data representing means mounted on said cartridge body for indicating an initial amount of said sheet in the cartridge to be read by the image recording apparatus.

13. A photo-sensitive sheet cartridge according to claim 12, wherein said data representing means comprises a magnetic bar code.

14. An image recording apparatus using a photosensitive recording medium on which an image is formed, comprising:

feed means for feeding the recording medium;

detecting means for detecting an amount of the recording medium fed by the feed means;

first calculating means for calculating a remaining amount of the recording medium based on the fed amount of the recording medium detected by the detecting means;

first setting means for setting one of a plurality of copy sizes;

a second setting means for setting one of a single copy mode where one by one copying is performed and a successive copy mode where successive copying is performed;

second calculating means for calculating a copyable number of images with the copy size set by the first setting means based on the remaining amount of the recording medium calculated by the first calculating means taking into consideration the copy mode set by the second setting means in calculating the copyable number of images; and display means for displaying the copyable number calculated by the second calculating means.

* * * * *